3,772,231
THERMOSETTING RESIN COMPOSITION

Satoru Enomoto, Mikio Fujioka, and Masao Koguro, Tokyo, Hisayuki Wada, Urawa, and Tsuyoshi Saito, Tokyo, Japan, assignors to Kureha Kagaku Kogyo Kabushiki Kaisha, Tokyo, Japan
No Drawing. Continuation of abandoned application Ser. No. 16,615, Mar. 4, 1970. This application Oct. 12, 1971, Ser. No. 188,599
Int. Cl. C08g 51/52
U.S. Cl. 260—28         2 Claims

ABSTRACT OF THE DISCLOSURE

A tar or pitch resin composition comprising an epoxide resin or a urethane resin and a tar or a pitch is disclosed.

CROSS REFERENCE TO RELATED APPLICATIONS

This is a continuation of application Ser. No. 16,615, filed Mar. 4, 1970, now abandoned.

BACKGROUND OF THE INVENTION

(1) Field of the invention

The present invention relates to a novel thermosetting resin composition containing tar or pitch. More particularly, it relates to thermosetting resin composition containing from 50 to 500 parts of a tar, having a viscosity of 800 to 500,000 cps. (25° C.), or a pitch, having a softening point of from 20 to 200° C., measured by the ring and ball method, per 100 parts of the thermosetting resin, which tar and pitch is free from oxygen, nitrogen and sulfur as determined by elementary analysis and contains acid substances at a level below $1 \times 10^{-2}$ mol/kg. The substance is condensed polycyclic aromatic compounds substantially consisting of carbon and hydrogen.

(2) Prior art

It is well known that a thermosetting resin comprising a combination of a prepolymer and a hardening agent, for example, an epoxide resin, a urethane resin, and the like, exhibits very excellent properties for use as an adhesive, as a coating, as paint and in molded articles. Also it is well known that, in addition to reducing cost, these thermosetting resins can be improved in weathering resistance, corrosion resistance to sea-water or water, resistance to inorganic agents, such as acid and alkali, resistance to organic agents, and mechanical properties such as impact strength by the addition of tar or pitch.

Most tars or pitches which have hitherto been used for the above purpose are coal tars or coal pitches which are the by-products obtained in manufacturing cokes from coal. Due to their origin incorporation of sulfur-, nitrogen- and oxygen-containing compounds cannot be avoided. Such impurities not only impart a peculiar odor to the tar and pitch but also have a deleterious effect on the human body when mixing the tars or pitches with a prepolymer and a hardening agent. Also, where such tars or pitches are used with epoxide resins as a coating for preventing corrosion in waterworks, the offensive odor remains even after the resin has hardened, and, therefore, the range of their use is restricted. In addition, the above-mentioned sulfur-, nitrogen- and oxygen-containing compound exists often as an impurity in the form of functional groups such as —SH, —NH and —OH. Such compounds containing active hydrogens with an epoxide resin reacts with the epoxy group to gellate the epoxy compound. Accordingly, when mixing the tar or pitch containing such impurity with the epoxy compound and on storage for a long period, the viscosity of mixture itself is increased and the addition of hardening agent on use becomes difficult. In order to solve this problem unnecessary solvent is added, or an addition of excess epoxy compound is required for complete hardening. In addition, when mixing an epoxy compound, a hardening agent and tar together in use, an active hydrogen of the impurity in the tar reacts with the epoxy compound and thereby the reaction is more promoted than is the situation where the tar is absent so that the time of use is decreased. Therefore, when mixing them in a large amount on the previous use, a material which is impossible to use may be produced.

On the other hand, with a urethane resin, a disadvantage results in that the time of use is decreased, because such active hydrogen compound reacts with isocyanate groups. In addition, these impurities allow the tar to contain water. When the tar contains water, the water reacts with the isocyanate group to produce an —$NH_2$ group and carbon dioxide gas. Evolution of carbon dioxide gas results in blowing and the urethane resin so obtained is decreased in strength. Additionally, such a resin is not desirable as a coating because of pin-holes. When an NCO— group changes to an —$NH_2$ group a poly-addition reaction does not take place and the degree of polymerization of the urethane resin decreases its mechanical properties. In order to prevent the decrease in mechanical properties, excess isocyanate generally is added. However, from the viewpoint of physical properties and economy, this is not preferable.

In addition, coal tar and coal pitch are largely influenced by the properties of the raw coals as their source and thus it is difficult to maintain the physical properties of the coal tar and coal pitch uniform. Also, to improve the deflection temperautre of pitch resin composition under load, it is necessary to improve the deflection temperature of the pitch. For this purpose it is possible to elevate the softening point of conventional coal pitch by heat treatment, however, disadvantageously the pitch loses its tackiness and its compatibility with the resin.

On the other hand, conventional asphalts, tars and pitches from petroleum oil have poor compatibility with urethane resins and epoxy resins, since they are less aromatic than coal tars. They also have the defect of not being able to avoid incorporation of sulfur and, therefore, are considered to be inappropriate for resin compositions.

The special tar and pitch relating to the present invention are materials having overcome completely the various defects or disadvantages of the above-mentioned coal tars and coal pitches, and petroleum asphalts.

That is, in the present invention it has been confirmed that the tarry or pitch like material obtained by heat treating a petroleum hydrocarbon at a temperature of above 700° C. and below 2300° C., preferably 900 to 1500° C., for from 5 to 0.001 seconds is composed of a group of dicyclic or more polycyclic aromatic compounds from which impurities of nitrogen, oxygen and sulfur, and the like, have been removed, resulting in the present invention. The pitches and tars relating to the present invention have excellent compatibility with a prepolymer and a hardening agent because of having a structure as described above. Therefore, the thus obtained resin compositions are excellent in chemical stability and in thermal and electrical characteristics. Additionally, due to the absence of the impurities of nitrogen, oxygen, sulfur, and the like, as described above, the offensive odor contained in the conventional tars and pitches is completely removed, and thereby the limitation in their range of uses caused by the presence of an offensive odor is completely removed. And also, because of their freedom from such impurities, their quality can be extremely easily maintained constant. Homogeneous tar and pitch always can be supplied by the fractional distillation of high temperature cracking tar or the mixing preparation of such distillates. Further, a resin composition having a high deflection temperature under load could be obtained actually for the first time according to the present invention because a pitch having a softening point of 200° C. can be obtained more easily from the high temperature cracking of petroleums in comparison with coal pitches. And also these tars can be alkylated easily with lower olefins, such as ethylene, propylene, butylene, and the like, in the presence of an acidic catalyst, such as silica-alumina, zeolite, aluminium chloride, and the like. The tar so obtained has advantages of a low viscosity and a high boiling point and has particularly its optimum use in molding articles. Incidentally, the conventional desulfurization operation is preferable since such operation prevents the alkylation catalyst from being poisoned due to impurities contained in the above-mentioned tars.

The tar and pitch of the present invention is a compound having a polycyclic aromatic structure substantially consisting of carbon and hydrogen, which can be obtained by the above mentioned operation and does not contain oxygen, nitrogen and sulfur by elementary analysis and contains below $1\times10^{-2}$ mol/kg. of acidic substances. These tars and pitches relating to the present invention can be varied in physical property depending upon the kinds, uses, molding methods, and the like, of resins to be used.

The tar is preferably within the range of from 800 to 500,000 cps. at 25° C. in viscosity as measured using a B type viscometer and pitch has a softening point preferably within the range of from 20 to 200° C. as measured by means of the ring and ball method. By blending these tars and pitches appropriately depending upon the kinds and uses of the resin, the desired tar or pitch can be easily prepared.

The blending proportion of these tars or pitches to the resin is in the range of from 50 to 500 parts of tar or pitch per 100 parts of resin. Below 50 parts the economic advantage of blending tar or pitch is too small and above 500 parts the desirable property of resin is not exhibited.

The thermosetting resins suitable for use in the present invention includes epoxy resins, urethane resins, alkyd resins, phenol resins, unsaturated polyester resins, and the like. Epoxy resins and urethane resins are preferred.

The epoxy resin of the present invention is a composition comprising a combination of an epoxy compound and a hardening agent. The epoxy compound is an alicyclic, aliphatic or aromatic compound having two or more epoxy groups in the molecule. A series of compounds obtained by the reaction of bisphenol A and epichlorhydrin are particularly remarkable. Commercially available typical products are, for example, the Epon resin series of the Shell Co. and the Araldite resin series of the Ciba Co. The hardening agent necessary to produce an epoxy resin is one having the ability of reacting with an epoxy group for linking each epoxy compound and forming a cross linking structure. As such hardening agents, many organic amines, polyamides, mercaptans, and polysulfides are disclosed. Also, an acid anhydride which does not directly react with an epoxy group but reacts with it in the presence of active hydrogen group can be used as a hardening agent in the present invention.

The urethane resin suitable for use in the present invention is a resin formed by the polymerization condensation isocyanates having the structure of

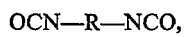

wherein R is an alicyclic, aliphatic or aromatic group, and a hardening agent component of the formula

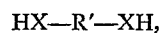

wherein R' is, for example, an alicyclic, aliphatic or aromatic group, having an active hydrogen group (—XH) such as —OH, —SH, —NH₂, —NH and the like and various combinations are obtained by varying R and R', and changing the ratio of NCO/OH, NCO/NH₂, and the like, by changing the ratio of OCN—R—NCO to HX—R'—XH.

The isocyanate component used in the present invention includes diisocyanates selected from alicyclic, aliphatic and aromatic isocyanates, for example, tolyene-diisocyanate (T.D.I); a mixture of 2,4- and 2,6-tolylene-diisocyanate; hexamethylene-diisocyanate; 4,4' - diphenyl-methane isocyanate; 1,5-naphthalene-diisocyanate; phenylenediisocyanate; octamethylenediisocyanate, 1-chlorphenyl diisocyanate, thiodipropyl diisocyanate, triphenylmethane-diisocyanate, dimer of T.D.I., and the like. As a commercial article, Desmodur (diisocyanates manufactured by the Bayer Co.) is commercially well-known, and in addition of the above-mentioned comparably simple isocyanates, there is listed an adduct of polyhydroxy compound having two or more OH groups and a diisocyanate, for example, an adduct of tri-methylol propane and T.D.I., and the like. As a prepolymer type there are listed polyarylene-diisocyanates, and prepolymers obtained by reacting an isocyanate and a polyhydroxy compound having a terminal isocyanate group, for example, diisocyanates with polyglycols, diisocyanates with polyesters, prepolymers by the reaction of a drying oil and a diisocyanate, and prepolymers by the reaction of diisocyanates with polyesters, polyethers or polyamides having amino groups.

As the hardening agent component, polyalcohols such as ethylene glycol, propylene glycol, tri-methylol-propane, glycerine, pentaerithritol, and the like, are used and polyethers of polyethylene-glycol, polypropylene glycol, and the like, adducts of a polyalcohol and ethylene-oxide or propylene oxide, and prepolymer of the polyester type are used. And also, a hardening agent having an amino group and/or amide group is suitable, such as alicyclic, aliphatic and aromatic diamines, such as methylene diamine, ethylene diamine, ethanol amine, diphenyl amine, phenylene diamine, diethyl-triamine, tetra-ethylene-pentamine, dibenzyl ethylene-diamine, and the like, and amines having a hydroxyl group. And also, a compound having a terminal amine group obtained by the reaction of a dibasic acid with diamines, diamides obtained by the reaction of dibasic acid anhydrides or chlorides with ammonia, and a reaction product of polyester and ethylene-imine, and the like, can be used.

The present invention has been illustrated with diisocyanates and a hardening agent component having an active hydrogen group, which form a polyurethane resin, and with an epoxy compound and a hardening agent which form an epoxy resin, but the present invention is not limited by these.

The above-mentioned special tars and pitches relating to the present invention can be optionally blended with either prepolymer or hardening agent, and can be modified further with other additives such as, for example, antioxidants, hardening accelerators, solvents, fillers, pigments, softening agents, curing catalysts, and the like.

The tar or pitch resin composition comprising resin blended with the special tar or pitch relating to the present invention is used as a coating, an adhesive, a sealing agent, a molding article, and the like, resulting not only in reducing the cost of raw material resin but also imparting extremely excellent water resistance and corrosive resistance in comparison with the raw material resin. Therefore, the composition can be used in various fields such as in civil engineering and the construction industry.

The present invention will be further illustrated in detail with reference examples and working examples. All parts are by weight.

REFERENCE EXAMPLE 3 kg. of tarry material obtained by heat treating petroleum naphtha at 1100° C. for 0.005 second were placed into a 5 l. round bottom flask and low boiling materials (above 245° C. and below 275° C.), were removed under a vacuum of 3 mm./Hg to prepare a tar (A–1) and a pitch (A–2), respectively. The properties of these materials, a commercially available material and an imported material, are shown in Table 1.

TABLE 1

|  | Product of the present invention | | Commercially available coal tar | Imported tar |
|---|---|---|---|---|
|  | A-1 | A-2 | | |
| Type | Tar | Pitch | Tar | Tar |
| Low boiling material removing temp. (° C.) | 245 | 275 | | |
| Viscosity, (cps.) (25° C.) | 2,800 | [1] 15,000 | 2,700 | 3,000 |
| Softening point (° C.) | | 25 | | |
| Elementary analysis, percent: | | | | |
| C | 95.71 | 95.90 | 90.62 | 90.33 |
| H | 4.29 | 4.10 | 5.05 | 5.70 |
| S | [2] | [2] | 0.2 | 0.2 |
| N | [2] | [2] | 0.55 | 1.01 |
| O | [2] | [2] | 1.40 | 1.13 |
| Water content, percent | [2] | [2] | [2] | [2] |
| Acidic substance (mol/kg.) | $5.6 \times 10^{-3}$ | $8.3 \times 10^{-3}$ | $3.2 \times 10^{-1}$ | $1.9 \times 10^{-1}$ |
| Distillation test, percent: | | | | |
| 0–170° C | | | | |
| 0–270° C | 12.3 | | | |
| 0–300° C | 28.6 | 7.2 | | |
| Softening point of distillation residue, °C | 51.2 | 53.4 | | |

[1] 50° C.
[2] Not observed.

Measurement of softening point: According to Ring and Ball Method, JIS K2531; viscosity: using B type viscometer. Method of measuring acidic substances. 30 g. of tar or pitch were dissolved in 200 cc. of purified benzene, and, thereafter, 30 cc. of 1 N solution of caustic soda were added thereto, and, after shaking, were allowed to stand to separate into an aqueous caustic soda solution, and an amount of consumed alkali was titrated with 1 N hydrochloric acid solution. Acidic substances in various commercially available tars ranged from 1 to $10^{-1}$ mol/kg.

REFERENCE EXAMPLE 2

Liquid fractions of 350 to 450° C. were removed from tarry material obtained by thermal cracking of naphtha at 800° C., 0.5 sec., in ethylene production. On the other hand, low boiling materials of below 300° C. were removed from the tarry material to prepare a medium pitch. The liquid fraction and the medium pitch were mixed in various proportions and stirred in an inert gas stream at 250° C. for 10 hours to obtain a material having an appropriate viscosity. Their properties are shown in Table 2.

TABLE 2

|  | B-1 | B-2 |
|---|---|---|
| Mixing ratio (pitch/liquid) | 30/70 | 50/50 |
| Viscosity (cps.) | [1] 36,000 | [2] 23,000 |
| Softening point (° C.) | | 28 |
| Elementary analysis, percent: | | |
| C | 95.89 | 96.02 |
| H | 4.11 | 3.98 |
| N | [3] | [3] |
| S | [3] | [3] |
| O | [3] | [3] |
| Acidic substance (mol/kg.) | $4.9 \times 10^{-4}$ | $8.5 \times 10^{-3}$ |

[1] 25° C.
[2] 50° C.
[3] Not observed.

As the result of elementary analysis conducted in the same manner as in Reference Example 1, sulfur, nitrogen, and oxygen were not observed and the amount of acidic substance was extremely small.

REFERENCE EXAMPLE 3

Tarry material obtained by heat treating Seria crude oil at 1200° C. for 0.003 second and 350 to 450° C.-liquid fraction prepared in Reference Example 2 were blended at the ratio of 50 to 50 and 750 to 30, by weight, and low boiling materials were removed under the conditions shown in Table 3.

TABLE 3

|  | C-1 | C-2 | C-3 | C-4 |
|---|---|---|---|---|
| Weight ratio—Reference Example 2/ Reference Example 3 | 50/50 | 50/50 | 30/70 | 30/70 |
| Low boiling material removing temperature (° C.) | 270 | 300 | 270 | 300 |
| Viscosity (cps.) (25° C.) | 3,200 | [1] 37,000 | 26,000 | [1] 21,000 |
| Softening point (° C.) | | 32 | | 27 |
| Elementary analysis, percent: | | | | |
| C | 95.87 | 96.19 | 95.99 | 96.30 |
| H | 4.13 | 3.81 | 4.01 | 3.70 |
| N | [2] | [2] | [2] | [2] |
| S | [2] | [2] | [2] | [2] |
| O | [2] | [2] | [2] | [2] |
| Acidic substance (mol/kg.) | $4.2 \times 10^{-3}$ | $8.1 \times 10^{-3}$ | $3.9 \times 10^{-3}$ | $9.2 \times 10^{-3}$ |

[1] 50° C.
[2] Not observed.

These samples contain no impurity, a small amount of acidic component, and no low boiling material of below 270° C.

REFERENCE EXAMPLE 4

1 kg. of tarry material obtained by heat treating Kuwait crude oil at 1350° C. for 0.007 second was charged into a 5 l. autoclave, and, after alkylating at 300° C. under 50 kg./cm.$^2$ of ethylene pressure in the presence of a silica-alumina catalyst, the alkylated tar was placed into a stainless steel flask, and the bath temperature was maintained at 700° C., and fractions distilled out under a reduced pressure of 5 mm./Hg were collected. Subsequently, these collected fractions were removed of low boiling materials of below various temperatures as shown in Table 4 to prepare tar and pitch.

TABLE 4

|  | D-1 | D-2 | D-3 |
|---|---|---|---|
| Low boiling material removing temperature (° C.) | 340 | 350 | 385 |
| Viscosity (cps.): | | | |
| 25° C | 3,000 | 3,200 | |
| 50° C | 180 | 280 | 14,300 |
| Softening point (° C.) | | | 25 |
| Elementary analysis, percent: | | | |
| C | 94.75 | 94.90 | 94.93 |
| H | 5.25 | 5.10 | 5.07 |
| N | [1] | [1] | [1] |
| S | [1] | [1] | [1] |
| O | [1] | [1] | [1] |
| Acidic substance (mol/kg.) | $3.2 \times 10^{-3}$ | $3.8 \times 10^{-3}$ | $4.3 \times 10^{-3}$ |

[1] Not observed.

As the result of having conducted the same analysis as in Reference Example 1, it was confirmed that there was no impurity, and low boiling materials of below 300° C. did not exist. D-1 and D-2 are particularly preferable for preparation of low viscosity and high boiling material.

REFERENCE EXAMPLE 5

The same tarry material as in Reference Example 3 was placed into a stainless steel flask and fractions of below 450° C. were removed under a vacuum of 3 mm./Hg. After cooling the distillation residue could be crushed to a powder, the softening point of which was 170° C., and, when analyzed in the same manner as in Reference Example 1, nitrogen, oxygen and sulfur was not present. Acidic materials existed in the amount of $6.5 \times 10^{-3}$ mol/kg.

REFERENCE EXAMPLE 6

The tar of the present invention was compared with a tar on the market in stability to oxidation and heat. Tar was placed in a 50 cc. flask provided with a gas inlet tube.

The flask was dipped in a bath at 100° C. and oxygen was blown into the tar through the gas-inlet tube. A sample of the tar was periodically taken out and its viscosity at 25° C. was measured to determine the thermal oxidation of the tar. The results are shown in Table 5.

TABLE 5

| Heating time (hour) | A-1 (cps.) | C-1 (cps.) | D-1 (cps.) | Commercially available tar |
|---|---|---|---|---|
| 0 | 2,800 | 3,200 | 3,000 | 2,700 |
| 25 | 3,400 | 4,500 | 3,600 | 360,000 |
| 50 | 5,700 | 6,200 | 4,200 | 727,000 |
| 100 | 23,600 | 30,800 | 10,300 | (¹) |

¹ Measurement impossible.

As can be seen from Table 5, the tar of the present invention is remarkably superior to the tar on the market in stability to thermal oxidation.

EXAMPLE 1

The compatibility of tar or pitch prepared in Reference Examples 1 to 6 with an epoxy compound and a hardening agent was determined. As the epoxy compound Epon 828, a diglycidyl ether of bisphenol A (DGEBA) resin having an epoxy equivalent weight of 185–192 and a viscosity of 10,000–16,000 cps. at 25° C., and 834, a diglycidyl ether of bisphenol A (DGEBA) resin having an epoxy equivalent weight of 230–280, manufactured by Shell Chemical Co. and Araldite 260, an epoxy resin having an epoxy equivalent weight of 180–200, and 280, an epoxy resin having an epoxy equivalent weight of 225–280, manufactured by Ciba Chemical Co., were used, and as the hardening agent, Versamide 125, a polyamide manufactured by General Mills Co., was used. 100 to 200 parts, by weight, of tar or soft pitch were added to 100 parts, by weight, of each of the epoxy compounds and mixed well. In case of soft pitch xylene was added thereto to control the viscosity of the mixture. Each mixture was coated on a slide glass and was observed by a microscope under four hundred magnifications. The mixtures were completely homogeneous and no insoluble substances were found. On the other hand, a commercially available tar and pitch used in an epoxy tar resin and epoxy pitch resin were tested in the same manner. The existence of fine black particles was confirmed and their compatibilities were found to be poor.

EXAMPLE II

The stability of the mixture of the tar of the present invention with an epoxy compound or a hardening agent was tested in comparison with that of a commercially available tar. As the epoxy compound Epon 828 was used and as the hardening agent Versamide 125 was used. Each of these was added to the tar in a weight ratio of 100 to 100 and was heated at 100° C. in air. A sample of the tar was periodically taken out and its viscosity at 25° C. was measured. Since the epoxy group in the composition is opened by oxidation and thermal decomposition to produce a hydroxyl group, the infrared absorption spectrum of the tar-epoxy mixture was measured to determine the change of the relative intensity ratio of the hydroxy group 3480 cm.$^{-1}$ to the epoxy group 913 cm.$^{-1}$. The results are shown in Table 6.

TABLE 6

| | Blend | | | | | |
|---|---|---|---|---|---|---|
| | Epon 828 | Versamide 125 | | Epon 828 | Versamide 125 | |
| | Sample C-1 | | | Tar on market | | |
| Heating time (hour) | Viscosity (cps., 25° C.) | Infrared (D3840/D913) | Viscosity (cps., 25° C.) | Viscosity (cps., 25° C.) | Infrared (D3840/D913) | Viscosity (cps., 25° C.) |
| 0 | 8,000 | 0.099 | 13,000 | 13,000 | 0.074 | 22,000 |
| 14 | 13,000 | 0.121 | 17,000 | 155,000 | 0.301 | 26,800 |
| 28 | 13,000 | 0.123 | 24,000 | 308,000 | 0.376 | 41,000 |
| 49 | 13,000 | 0.140 | 29,500 | 530,000 | 0.340 | 47,000 |
| 70 | 14,000 | 0.141 | 30,000 | 700,000 | 0.660 | 53,200 |
| 91 | 14,000 | 0.140 | 33,000 | 1,180,000 | 0.680 | 60,000 |
| 110 | 20,000 | 0.143 | 56,500 | (¹) | 0.720 | 71,000 |

¹ Measurement impossible.

As is apparent from Table 6, the tar of the present invention exhibits excellent stability in the combination with the epoxy compound and its hardening agent in comparison with the tar on the market. In case of adding a hardening agent to a mixture of tar and epoxy compound to prepare an epoxy tar resin, the tar to be used in the present invention can exist stably with the epoxy compound, in the absence of the hardening agent. This could not be accomplished hitherto.

EXAMPLE III

Epon 834 and the tar of the present invention were used to prepare an epoxy tar paint, the properties of which were then investigated.

Formulation of paint

| Component A: | Parts |
|---|---|
| Epon 834 | 24.5 |
| Tar ¹ | 36.5 |
| Silica | 18.0 |
| Serisite FS ² | 8.0 |
| Xylene | 6.5 |
| Secondary butanol | 6.5 |
| Component B: | |
| Epon 834 | 42 |
| DTA ³ | 16 |
| Xylene | 21 |
| Secondary butanol | 21 |

¹ Tar used A-2, B-2, and C-2.
² Serisite FS—Inorganic filler.
³ DTA—Hardening agent, diethylenetetramine.

Component A and component B were blended at a rate of 8 to 2, by weight, and were coated on a grit blasted soft steel plate in thickness of about 200 m$\mu$ using a brush. On standing at an ordinary temperature, the coating properties were investigated. The results are as shown in Table 7–1 and Table 7–2.

TABLE 7-1

|  | A-2 | B-2 | C-2 |
|---|---|---|---|
| Bending (on 3 mm. mandrel) | Pass | Passg | Pass. |
| Impact strength (Du Pont type 500 g., 50 cm.). | do | do | Do. |
| Adherence (checkers test 10 x 10) | do | do | Do. |
| Hardness (pencil) | 2H | 4H | 2H. |

TABLE 7-2.—RESISTANCE TO CHEMICALS

| | | | |
|---|---|---|---|
| Methylisobutylketone | Slightly soft after 2 hours | Slightly soft after 3 hours | Slightly soft after 2 hours. |
| Distilled water | No change for 2 years | No change for 2 years | No change for 2 years. |
| 5% sulfuric acid | Slightly swollen after 2 months. | Slightly swollen after 5 months. | Slightly swollen after 2 months. |
| 10% caustic soda solution | No change for 2 years | No change for 2 years | No change for 2 years. |
| Endurance in the open (exposure for two years). | No change | No change | No change. |

EXAMPLE IV

The tars A-1 and D-2 of the present invention were used to make casting articles the mechanical characteristics of which were then investigated.

Recipe for cast

Component A: Parts
- Epon 828 — 30
- Epon 815 [1] — 70

Component B:
- Tar — 89
- TTA [2] — 10
- DMP-30 [3] — 1

[1] Epon 828 diluted with 11% butyl glycidyl ether.
[2] Hardening agent $H_2N-(C_2H_4NH)_2-C_2H_4NH]$.
[3] DMP-30: Hardening promoter.

Component A and component B were mixed at the ratio of 1 to 1 and after allowing to stand at room temperature for one night, were hardened at 60° C. for 24 hours and their mechanical characteristics and deflection temperatures under load were measured. As the result of analyzing alkyl chain proton in the tar used in the present working example using a NMR having a high analyzing ability, A-1 is 12.3% alkyl chain proton and D-2 is 30.4%. As shown in Table 8, the higher the content of alkyl chain is, the better the tensile strength and the impact strength are.

TABLE 8

| | A-1 | D-2 |
|---|---|---|
| Tensile strength (kg./cm.²) | 302 | 385 |
| Elongation (percent) | 6 | 12 |
| Izod impact strength (kg.-cm./cm.⁻² notch) | 1.9 | 3.1 |
| Barkol hardness (at 25° C.) | 38 | 31 |
| Deflection temperature under load | 85 | 80 |
| Dielectric constant (25° C., 1 kc./sec.) | 4.20 | 4.20 |
| Power factor (25° C., 1 kc./sec.) | 0.018 | 0.020 |
| Volume inherent resistivity (25° C., Ω-cm.) | $10^{16}$ | $10^{16}$ |

EXAMPLE V

The pitch of the present invention (Reference Example 5) and the pitch on the market were investigated as to their heat resistance characteristics. To 100 parts, by weight, of Epon 828, 80 parts by weight of methyl-radic acid anhydride and 3 parts by weight of hardening promotor DMP-30, pitch was added in various ratios and hardening was conducted first at 80° C. for 3 hours, subsequently at 120° C. for 6 hours, and finally at 200° C. for 10 hours. The results of measuring deflection temperature under load are shown in Table 9.

TABLE 9

| | Pitch of the present invention, ° C. | Pitch on the market, ° C. |
|---|---|---|
| Mixing ratio, phr.: | | |
| 0 | 135 | 135 |
| 40 | 122 | |
| 100 | 116 | |
| 120 | 110 | 90 |
| 150 | 108 | 78 |
| 200 | 97 | 72 |

From the above the epoxy pitch composition containing pitch of the present invention has been proved to be higher in deflection temperature under load than the composition containing pitch on the market by 25 to 30° C.

EXAMPLE VI

The compatibility of tars or pitches prepared in Reference Examples 1 to 5 with an isocyanate compound was investigated.

As the isocyanate, tolylene diisocyanate, hexamethylene diisocyanate, hexamethylene diisocyanate dimer, 1,5-naphthylene diisocyanate, methylene bis(p-phenylene) diisocyanate, 4,4',4''-triphenyl methane triisocyanate, an adduct of hexantriol and T.D.I., and an adduct of trimethylol propane and T.D.I. were used. 100 parts, 200 parts and 500 parts of tar or pitch were mixed to 100 parts of isocyanate (by weight), respectively, and were allowed to stand for one night.

Separation of phases and other unfavorable phenomena were not observed and a coating coated on a glass plate was uniform. Also, a coating on a slide glass was completely uniform under a microscope of 400 magnification. On the other hand, the commercial tar and pitch were somewhat poor in compatibility and black fine particles were observed under a microscope.

EXAMPLE VII

The compatibilities of tars and pitches prepared in Reference Examples 1 to 5 with polyols were tested. As a polyol, Desmophen 800 (a polyester consisting of phthalic anhydride, adipic acid, trimethylol propane and glycerin manufactured by the Bayer Co.) and Desmophen 1200 (a polyester consisting of adipic acid, 1,4-butylene glycol and hexane triol; Bayer Co.) as a polyester type, and Adeka polyether T series 300, 400, 700, 1500 and 2500, which are adducts of trimethylol propane and propylene oxide manufactured by Asahi Denka Co., and Adeka polyester P series 400, 700, 1000 and 2000, which are polypropylene oxides as a polyether type, and Olester #C1000 and #C1066 manufactured by Mitsui Toatsu Chemical Co. as a castor-oil type were used. As in Example VI, 300 parts and 500 parts of tar and pitch were mixed with 100 parts of polyol, respectively, and were allowed to stand for one night. A coating on a glass plate was uniform and was good in compatibility. A coating on a slide glass was not recognized to be wrong under a microscope of 400 magnification. On the other hand, in case of adding 500 parts of commercial tar or pitch, the compatibility was clearly poor and black fine particles were observed under a microscope.

EXAMPLE VIII

Each of the tars of the present invention shown in the reference examples and a tar on the market was mixed with an isocyanate component and a hardening agent, and were compared on usable time. That is, 96 parts by weight of triisocyanate (TMPI) obtained by reacting 1 mole of trimethylol propane and 3 moles of T.D.I., 50 parts by weight of hardening agent, Desmophen 800 (manufactured by Bayer Co.) and 45 parts by weight of tar were placed into a 300 cc. beaker at 5° C. and 20° C. and were stirred well by a stirring rod.

The usable time (hour) means such time that the stirring becomes difficult due to hardening and, when holding up the stirring rod, the entire vessel is held up. The results are as shown in Table 10.

TABLE 10

| Measuring temperature, °C. | No tar | Tar of the present invention | | | Tar on the market | | |
|---|---|---|---|---|---|---|---|
| | | A-1 | B-1 | D-1 | No. 1 | No. 2 | No. 3 |
| 20 | 12.00 | 13.00 | 16.00 | 13.00 | 1.00 | 0.80 | |
| 5 | 24.00 | 26.00 | 28.00 | 26.00 | 4.00 | 3.50 | 1.00 |

Usable time (hours) of tar of the present invention and tar on the market as an urethane tar resin.

As is apparent from the above table, the tar on the market is not preferred in actual use since it shortens the usable time. In contrast the tar of the present invention can extend the usable time.

EXAMPLE IX

The tars or pitches of the present invention as shown in the reference examples were examined for properties as an urethane tar paint.

Paint recipe

| | Parts |
|---|---|
| TMPI | 37.6 |
| Desmophen 800 | 12.4 |
| Tar or pitch | 50 |

The tar of the present invention or the tar on the market in the above recipe was coated on a sand-blasted soft steel plate and, after seven days, the performance of the coating was tested. In case of pitch A-2, xylene was used as a solvent.

TABLE 11

| | Pitch of the present invention, A-2 | Tar of the present invention, C-1 | Tar on the market | |
|---|---|---|---|---|
| | | | No. 1 | No. 2 |
| Coating thickness of one brush (μ) | 190-200 | 180-195 | 175 | 180. |
| Ericsen test (mm.) | 5 | 6 | 4 | 45. |
| Impact test (500 gcm.) | 50 | 50 | 20 | 30. |
| Bending resistance | Pass on 3 mm. mandrel. | Pass on 3 mm. mandrel. | Pass on 3 mm. mandrel. | Pass on 3 mm. mandrel. |
| Checkers test | Pass | Pass | Pass | Pass. |
| Hardness (pencil) | 3H | 2H | H | H. |
| Usable time (20° C., hrs.) | 14.00 | 13.00 | 1.00 | 0.80. |

As is apparent from the above table, not only the pitch or tar of the present invention is easy to use but also the pitch or tar is excellent in physical property. According to the result of the weathering test in the open air for two years, the material using the tar on the market lost gloss but that using the pitch or tar of the present invention was not changed.

EXAMPLE X

The properties of the tar of the present invention as shown in the reference examples and the tar on the market as an urethane tar were examined as a sealant.

Sealant recipe

| | Parts |
|---|---|
| Takenate XL-1011, manufactured by Takeda Pharmaceutical Co. | 100 |
| Takelack P-22, manufactured by Takeda Pharmaceutical Co. | 72 |
| Tar | 144 |
| Baked gypsum | 144 |
| Catalyst (dibutyl-tin-dilaurate) | 4 |

TABLE 12

| | Tar of the present invention | | Tar on the market |
|---|---|---|---|
| | A-1 | D-1 | |
| Tensile strength (kg./cm.²) | 21.1 | 20.1 | 17.0 |
| Elongation (percent) | 56.0 | 730 | 420 |
| Hardness | 40 | 35 | 39 |
| Adherence (kg./cm.²): | | | |
| Concrete | 12.0 | 11.5 | 8.9 |
| Aluminum | 11.6 | 10.5 | 7.8 |
| Glass | 11.2 | 10.4 | 7.6 |

As is apparent from the above table, the tar of the present invention is superior to the tar on the market in either tensile strength, elongation, and adherence.

What is claimed is:

1. A thermosetting resin composition characterized in that it comprises from 50 to 500 parts, by weight, of a tar having a viscosity of from 800 to 500,000 cps. at 25° C. or a pitch having a softening point of from 20 to 200° C. as measured by the ring and ball method to each 100 parts by weight of a thermosetting resin selected from the group consisting of an epoxy resin and a urethane resin, said tar or pitch being a condensed polycyclic aromatic compound substantially consisting of carbon and hydrogen, said tar or pitch being free of nitrogen, oxygen, and sulfur and containing less than $10^{-2}$ moles per kilogram of an acidic substance and being obtained by heat treating a petroleum hydrocarbon at from 900 to 1500° C. for from 0.5 to 0.005 second.

2. The thermosetting resin composition as set forth in claim 1 wherein said tar or pitch is a product obtained by heat treating a petroleum hydrocarbon at from 900 to 1500° C. for from 0.5 to 0.005 second and further alkylating it with a lower olefin.

References Cited

UNITED STATES PATENTS

| 3,015,635 | 1/1962 | Bradley | 260—28 |
| 2,906,720 | 9/1959 | Simpson | 260—28 |
| 3,297,056 | 1/1967 | McLaughlin | 260—28 |

ALLAN LIEBERMAN, Primary Examiner

P. R. MICHL, Assistant Examiner

U.S. Cl. X.R.

208—44